United States Patent [19]

Bowman

[11] 4,265,141
[45] May 5, 1981

[54] MECHANICAL FORCE MULTIPLIER

[75] Inventor: Jeffrey M. Bowman, York, Pa.

[73] Assignee: International Telephone and Telegraph Corporation, New York, N.Y.

[21] Appl. No.: 925,008

[22] Filed: Jul. 17, 1978

Related U.S. Application Data

[63] Continuation of Ser. No. 754,719, Dec. 27, 1976, abandoned.

[51] Int. Cl.³ .......................... G05G 1/04; F16K 31/44
[52] U.S. Cl. ......................................... 74/516; 74/520; 251/280
[58] Field of Search .................... 74/520, 516; 251/58, 251/279, 280; 100/272

[56] References Cited

U.S. PATENT DOCUMENTS

| 363,643 | 5/1887 | Jacobs | 251/58 |
| 566,452 | 8/1896 | Foster | 251/58 |
| 958,206 | 5/1910 | Allen | 251/58 |
| 1,477,641 | 12/1923 | Francis | 251/280 |
| 1,513,424 | 10/1924 | Richards | 251/58 |
| 2,344,594 | 3/1944 | Bryant | 251/280 |
| 2,659,387 | 11/1953 | Farris | 251/58 |
| 2,780,117 | 2/1957 | Bauer et al. | 100/272 |
| 3,510,101 | 5/1970 | Burtis | 251/280 |

Primary Examiner—Kenneth Dorner
Attorney, Agent, or Firm—John T. O'Halloran; Alfred C. Hill

[57] ABSTRACT

This multiplier includes a first link unit in a force transferring relationship with one of an actuator and a device to be actuated. A second link unit is pivotably connected to the first link unit in a force transferring relationship with the other of the actuator and the device to be actuated. At least one spring in a force transferring relationship with at least one of the first and second link units is provided. The first and second link units are disposed between the actuator and the device to be actuated with the first and second link units in cooperation with each other and the spring providing a relatively linearly increasing multiplied output force to the device to be actuated when the actuator is actuated.

26 Claims, 25 Drawing Figures

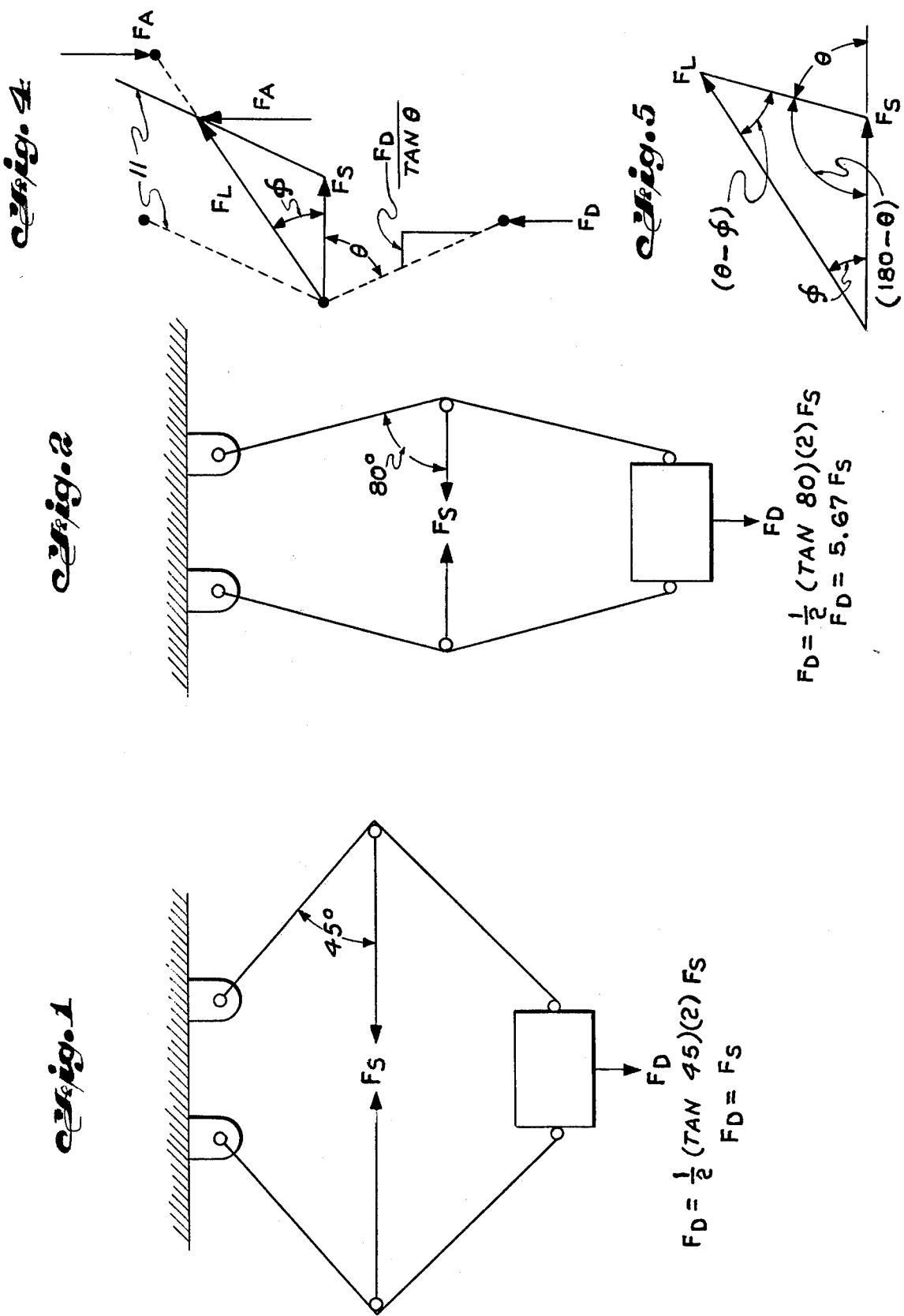

Fig. 3

| CONFIGURATION AT θs | SPRING LINK ANGLE θs | REQUIRED FORCE PSI $F_D$ | REQUIRED SPRING FORCE PSI $F_S$ |
|---|---|---|---|
| | 45° | 1600 | 1600 |
| | 62° | 3493 | 1857 |
| | 80° | 5300 | 934 |

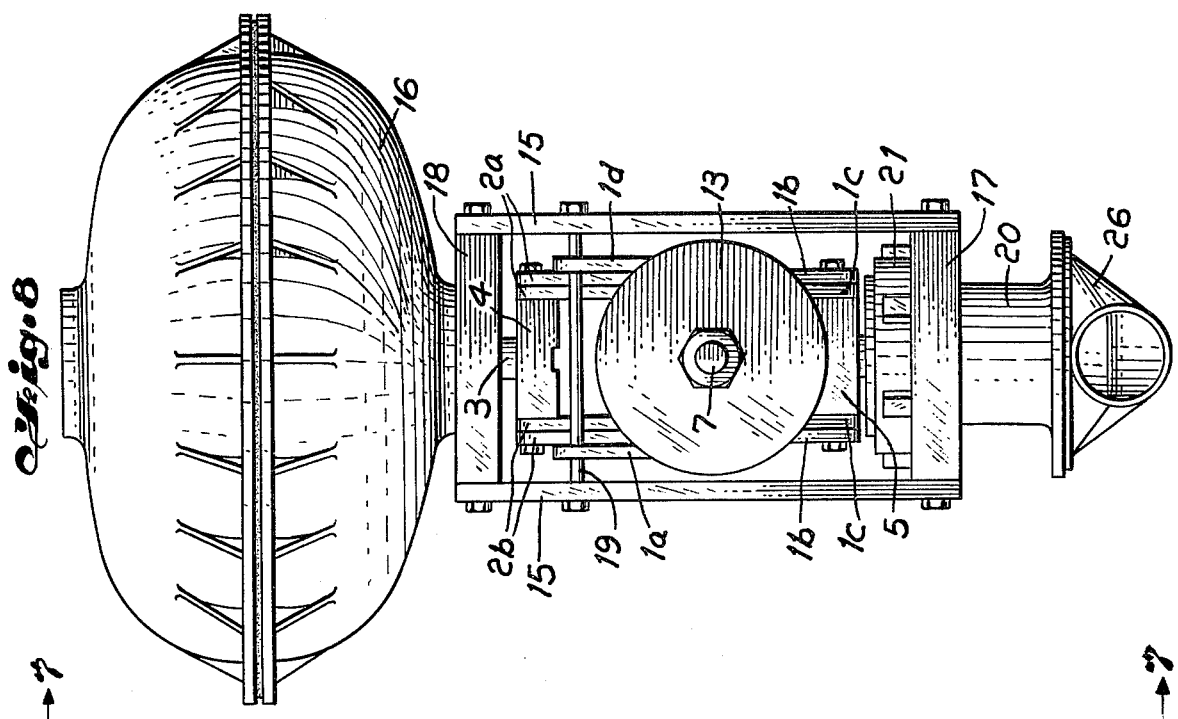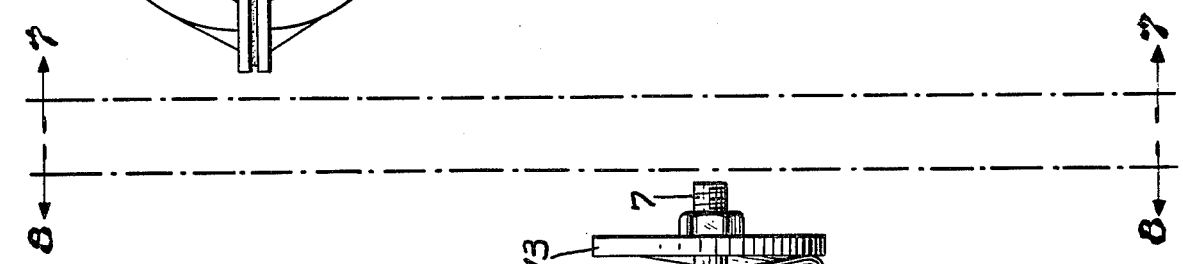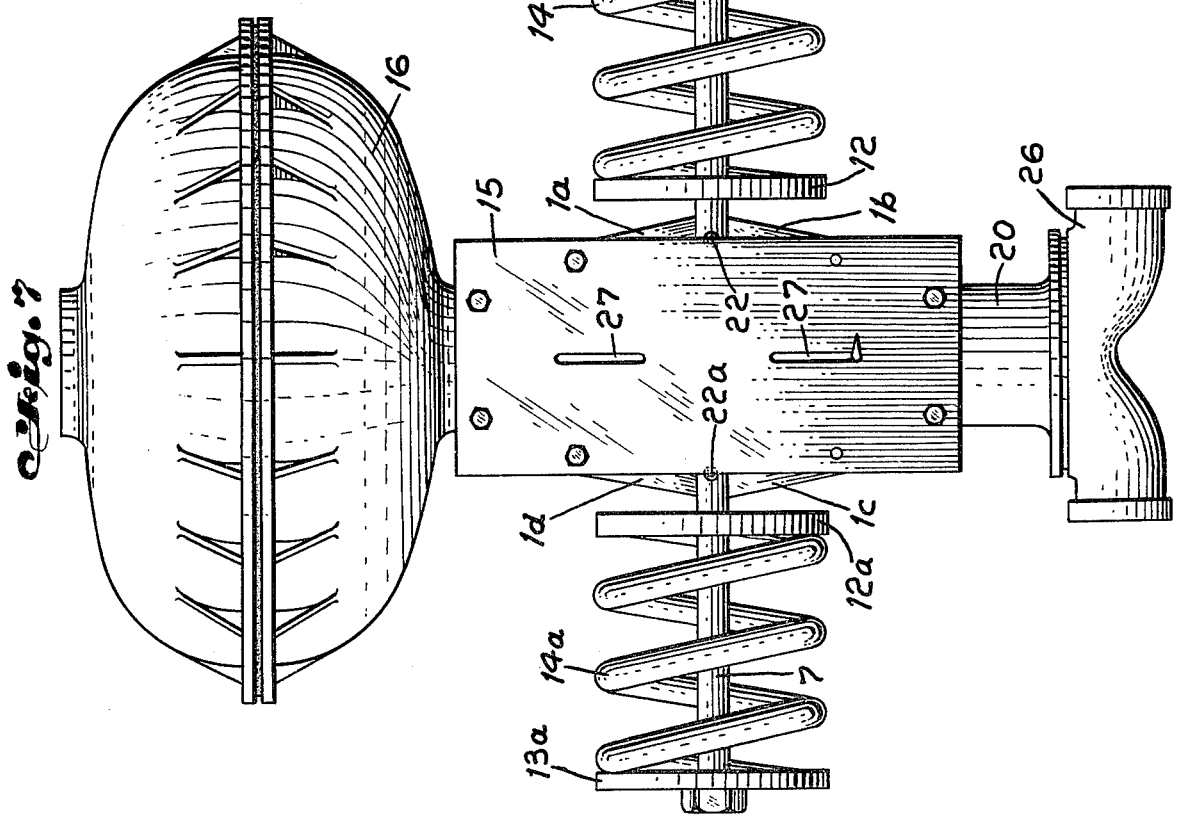

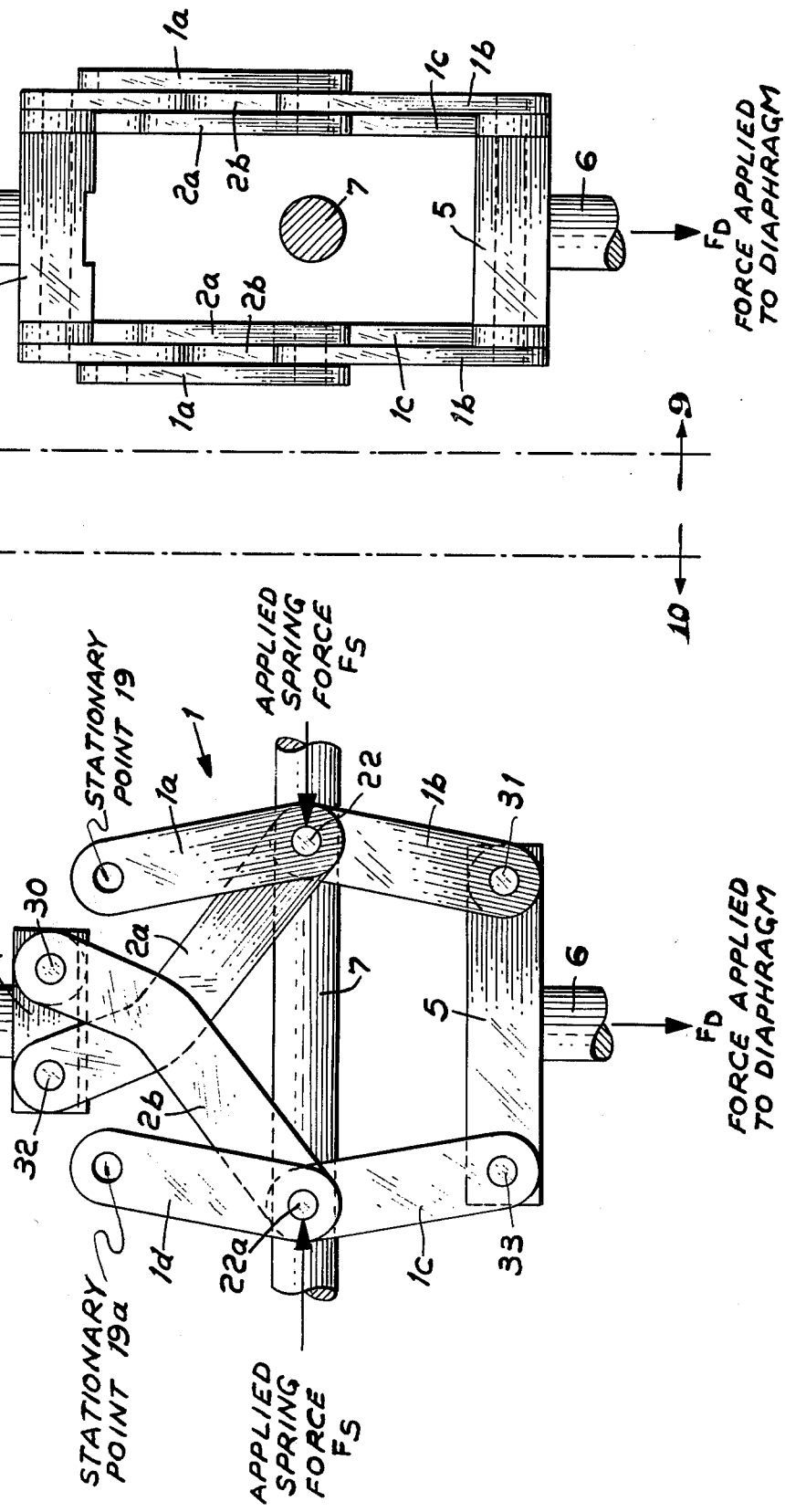

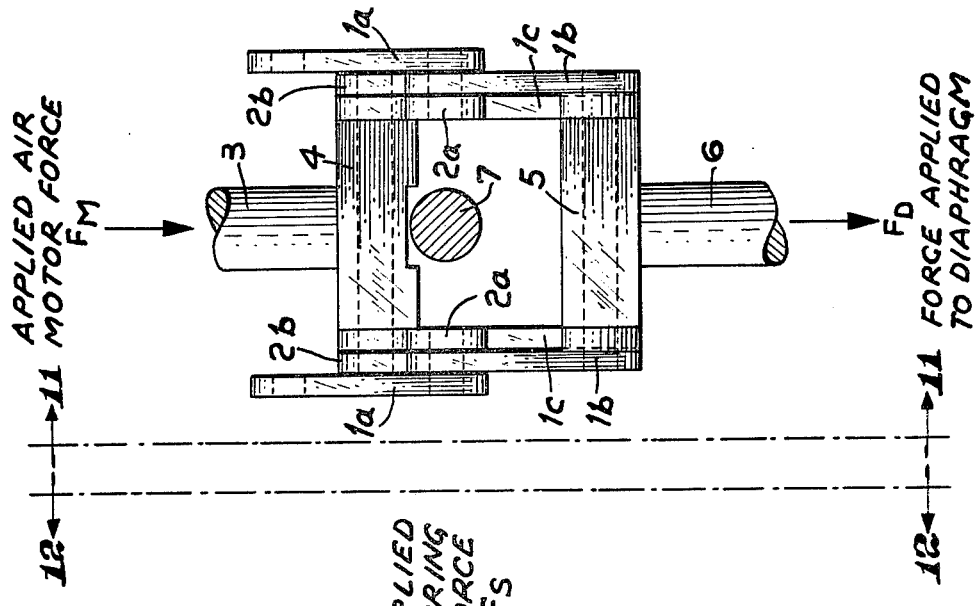
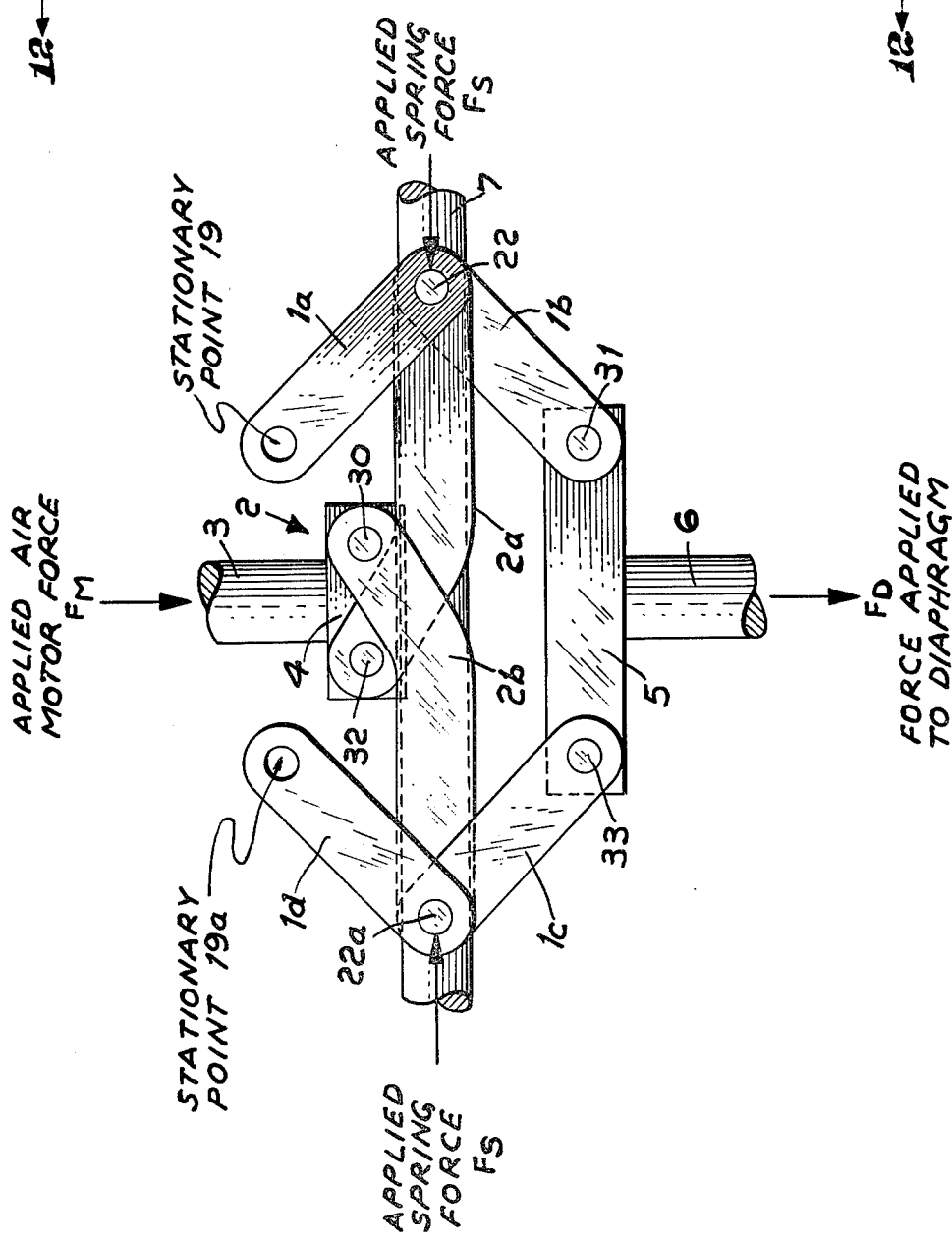

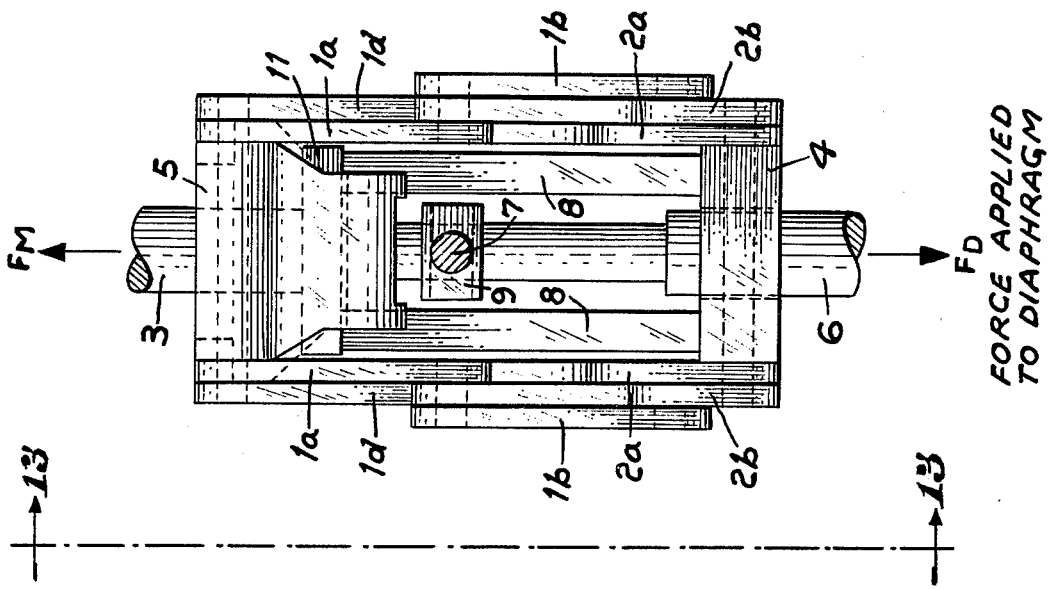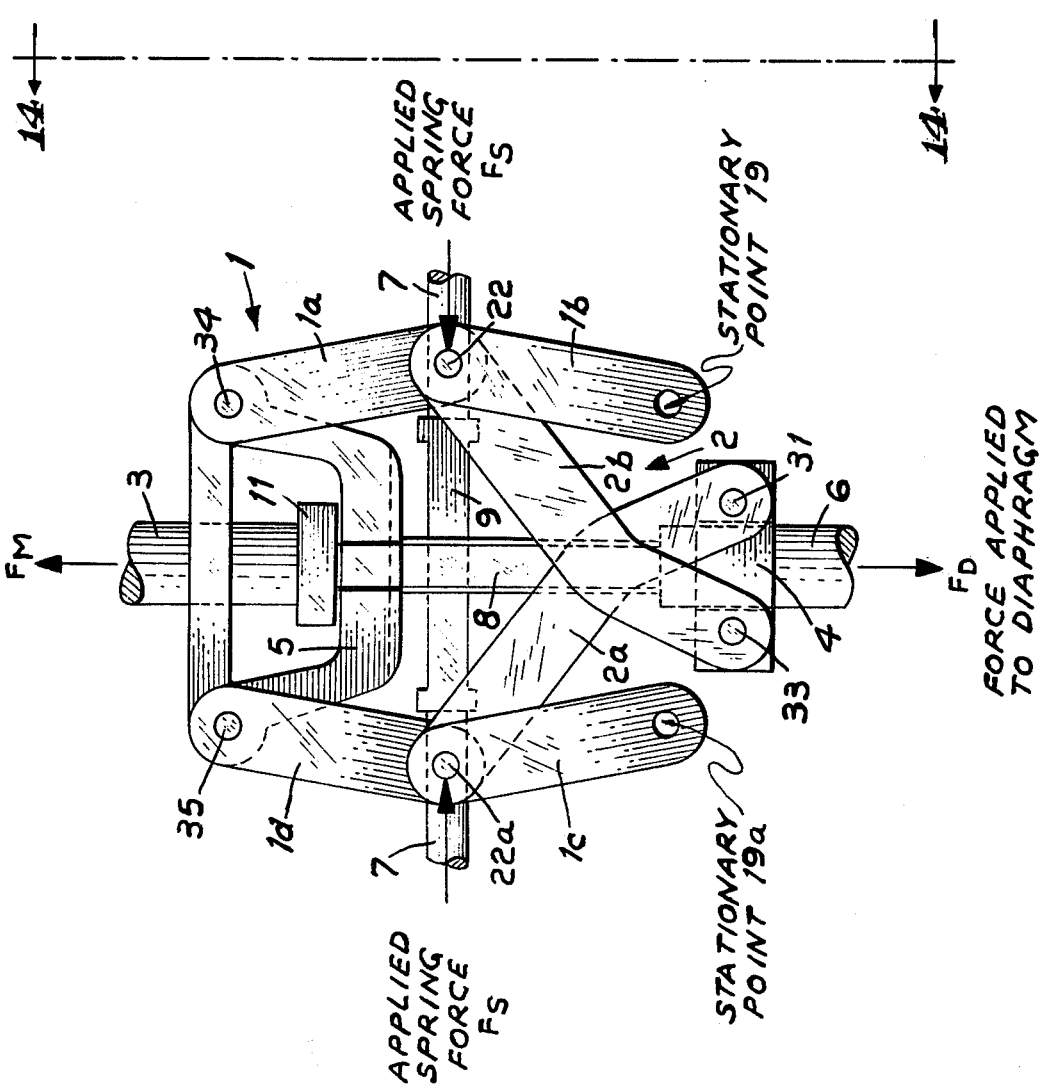

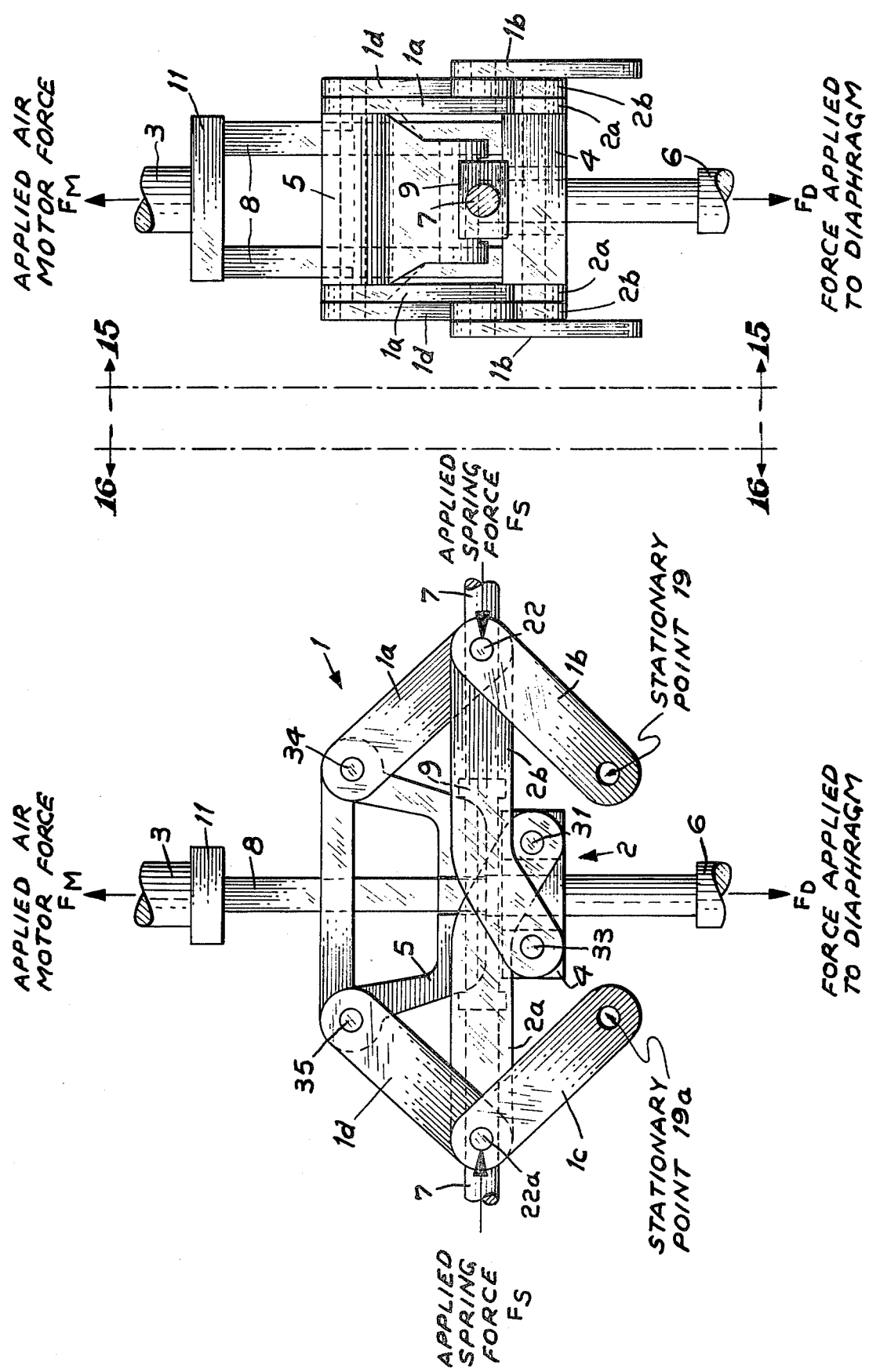

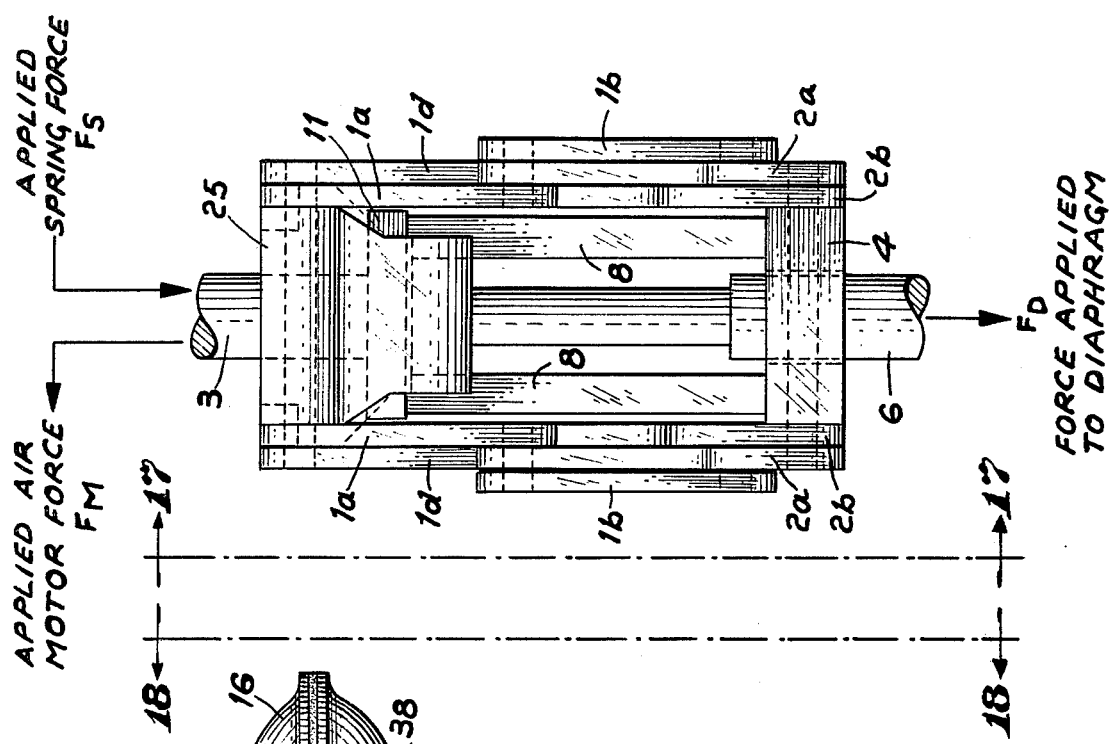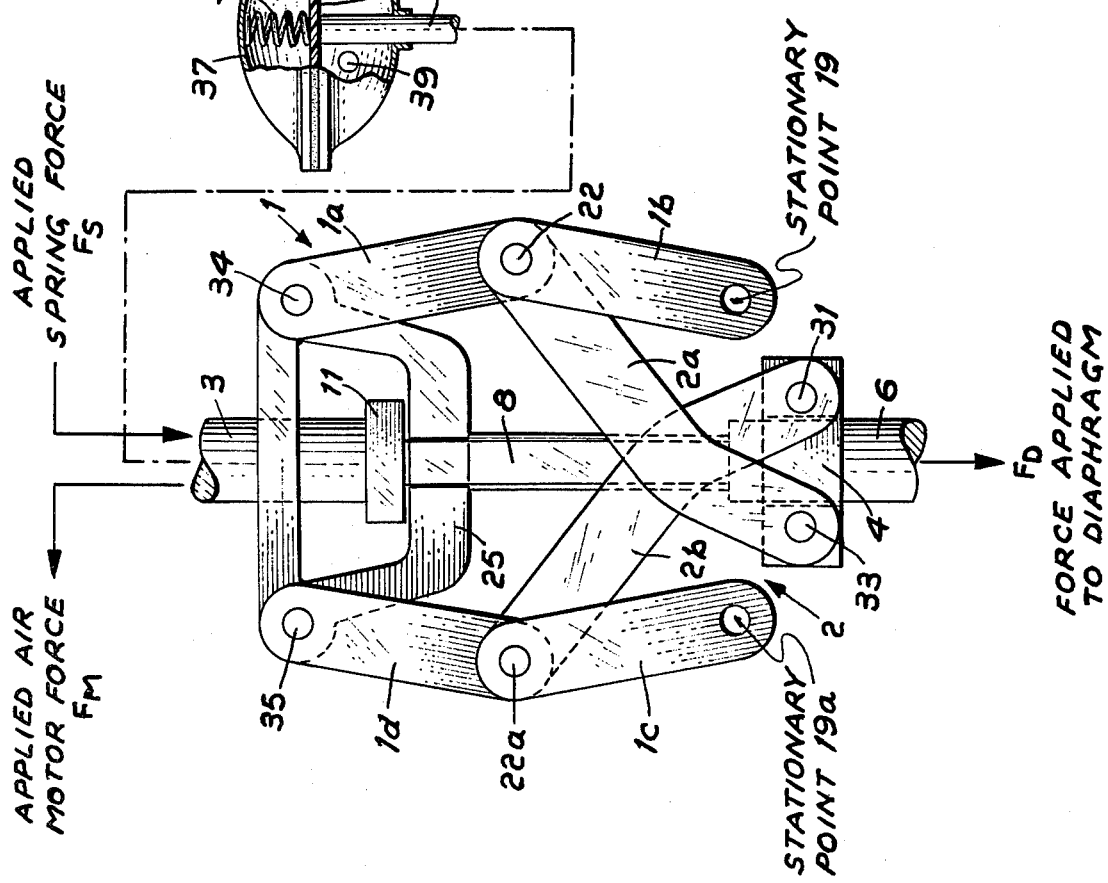

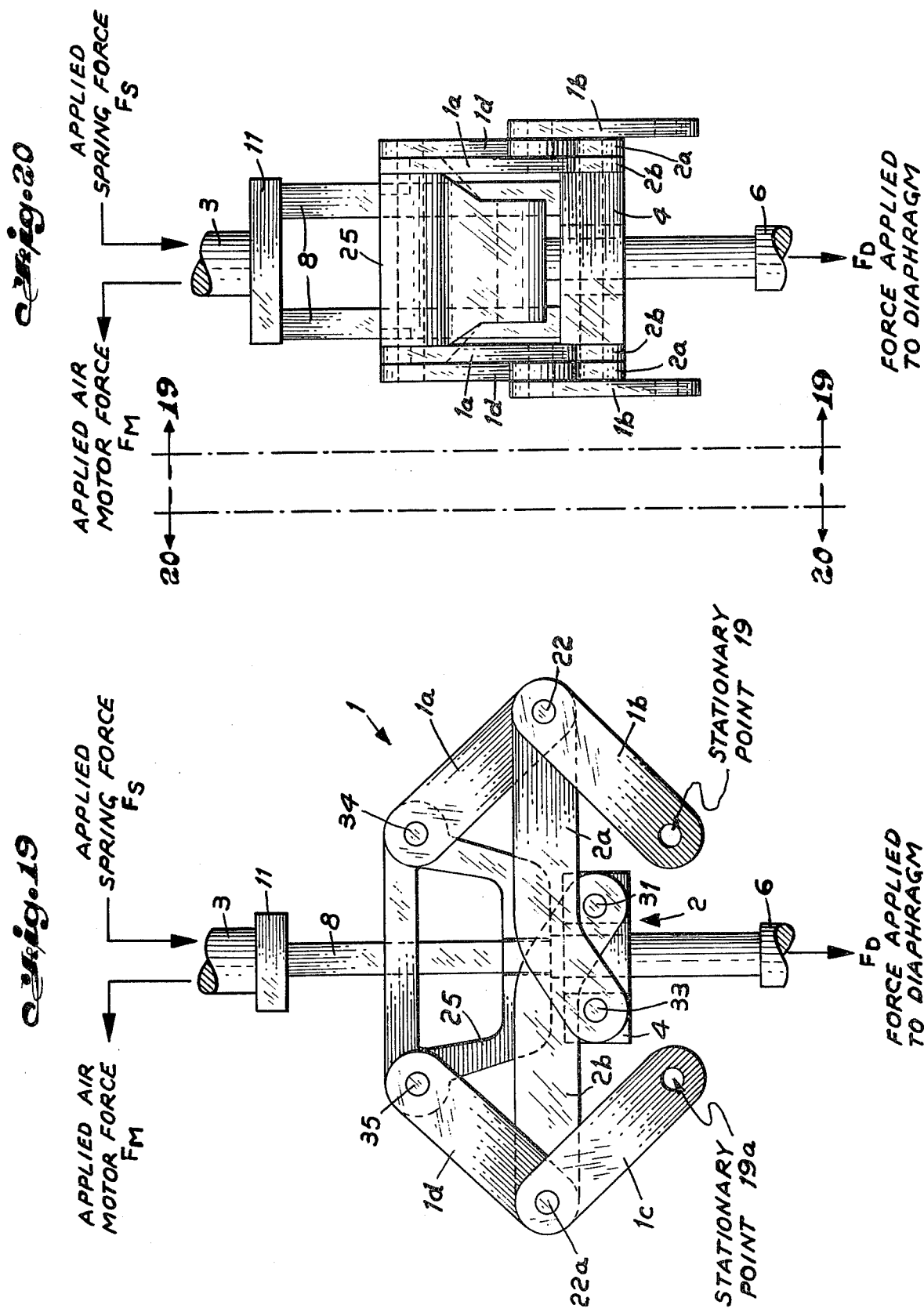

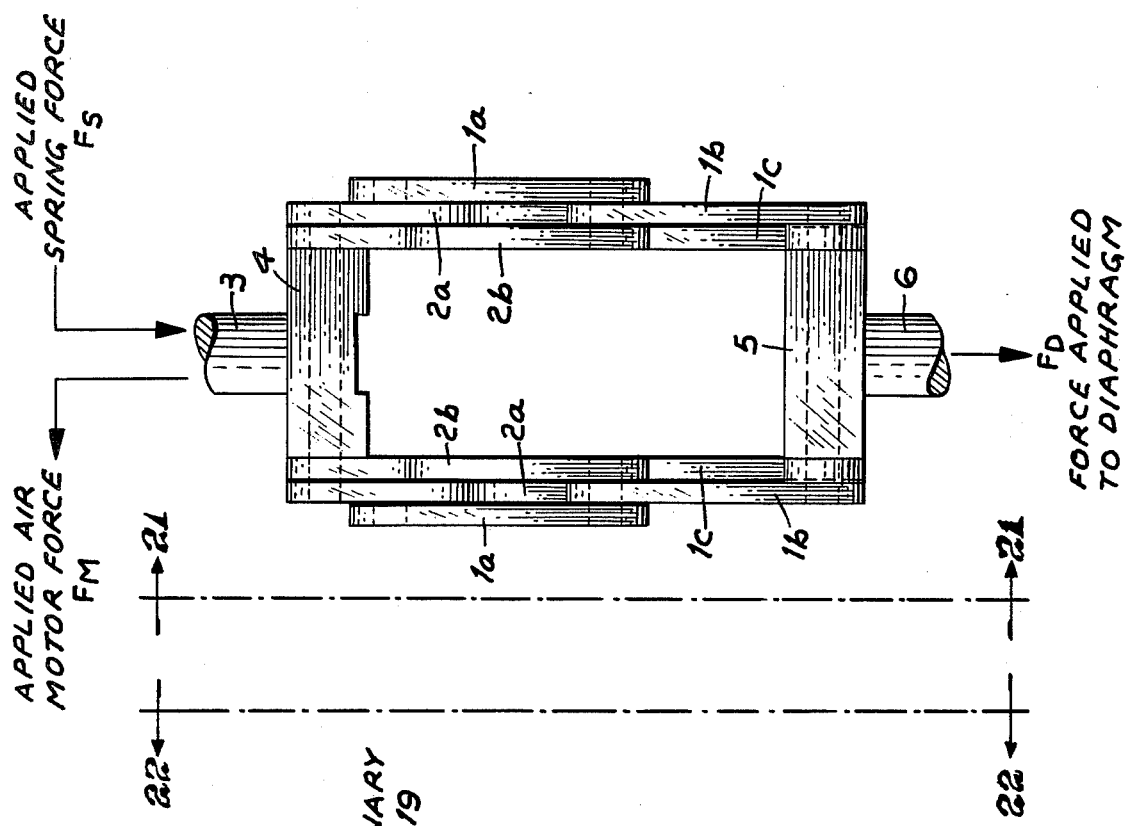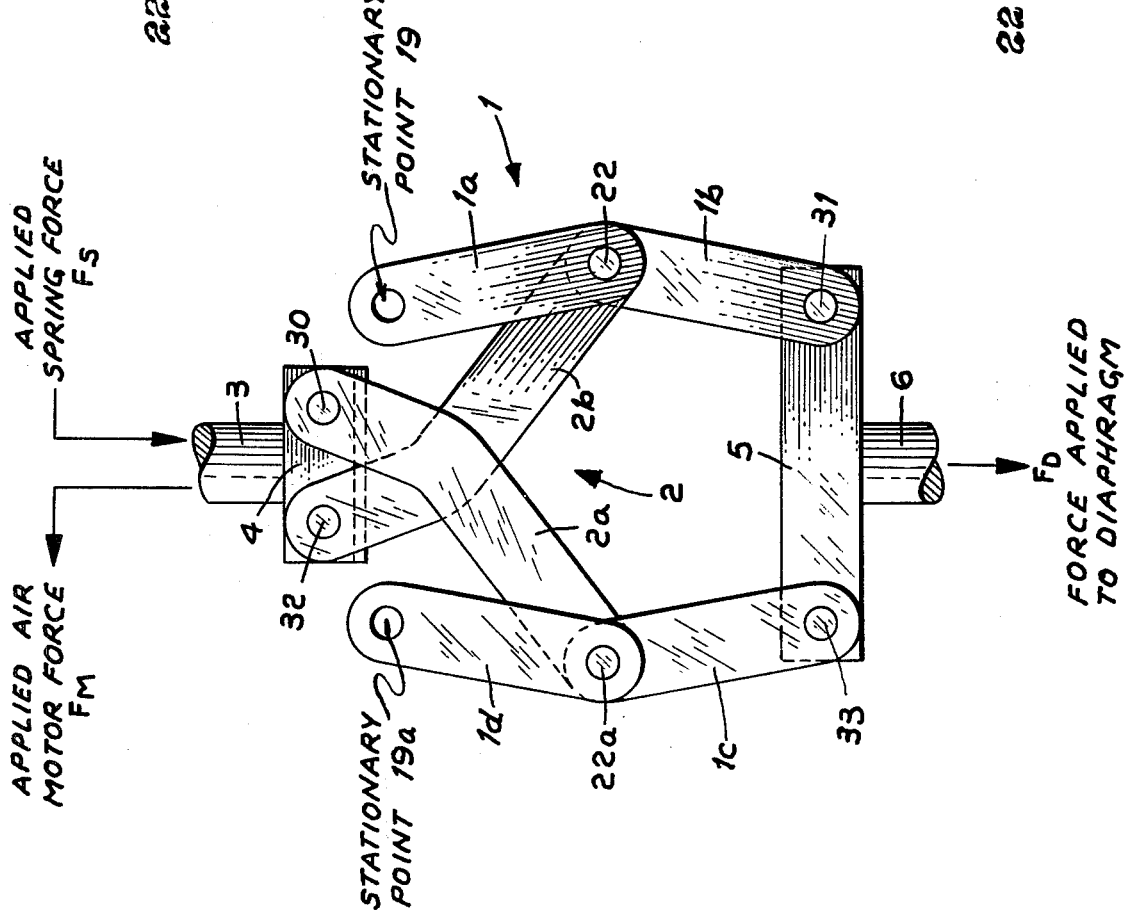

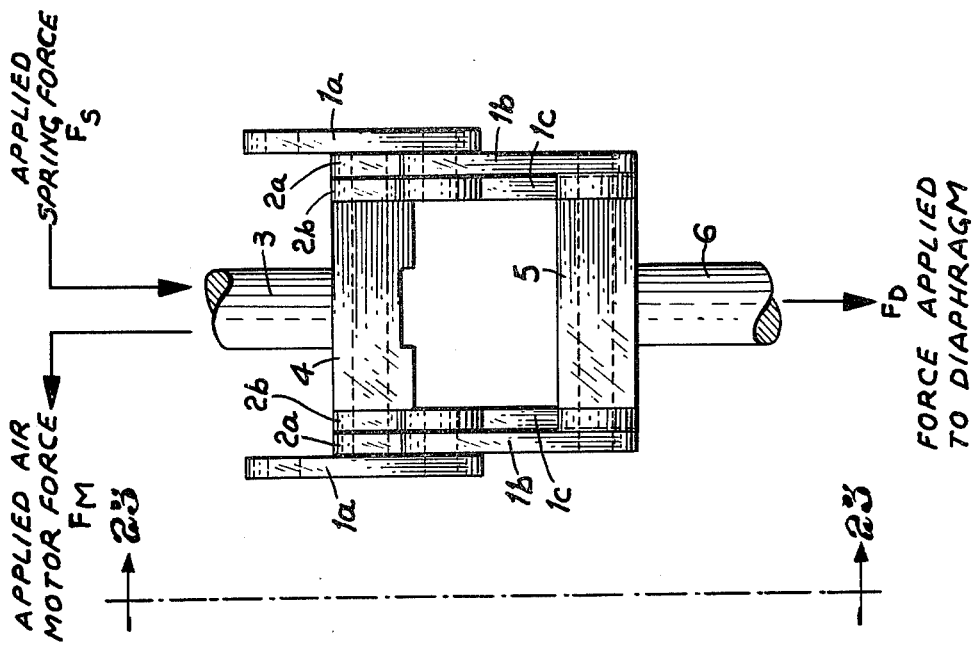
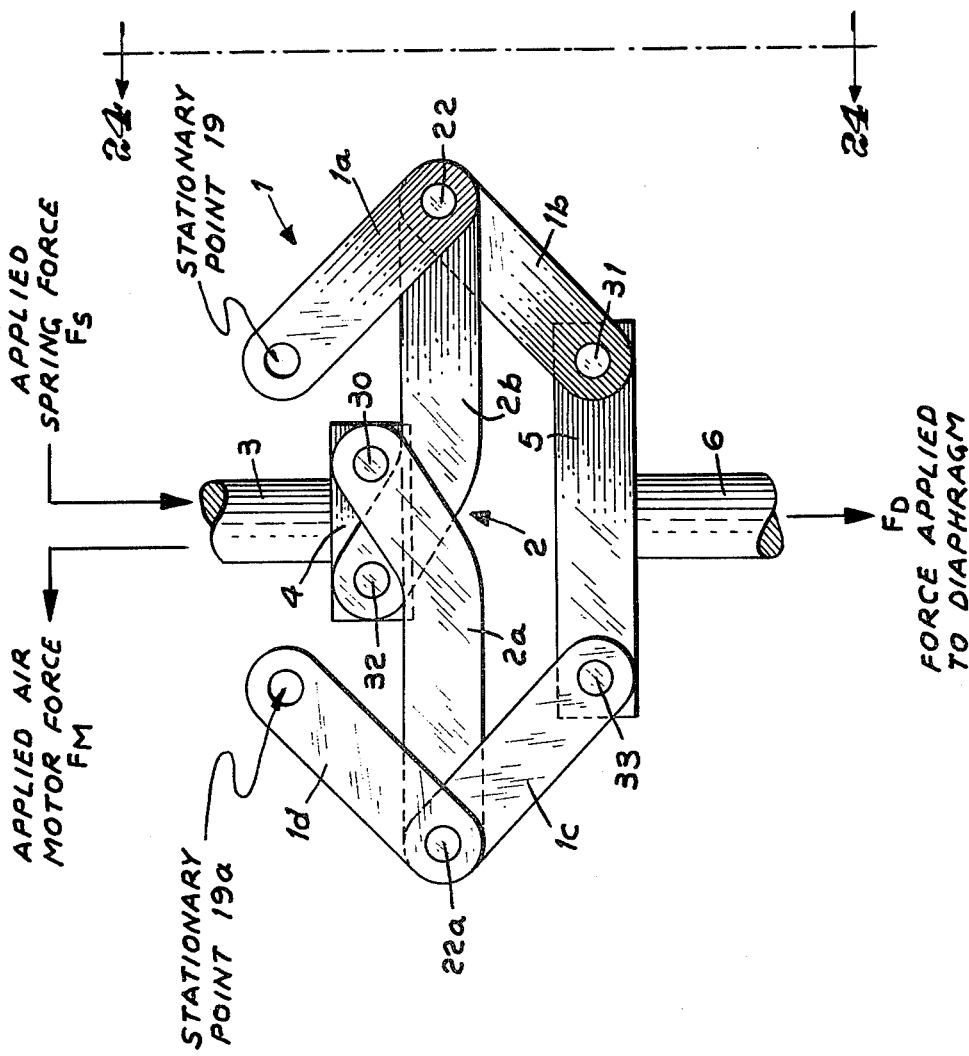

MECHANICAL FORCE MULTIPLIER

CROSS-REFERENCE TO RELATED APPLICATIONS

This is a continuation of application Ser. No. 754,719, filed Dec. 27, 1976 now abandoned.

BACKGROUND OF THE INVENTION

The present invention relates to force multipliers and more particularly to mechanical force multipliers.

The following description of the mechanical force multiplier of the present invention is directed to its employment in a diaphragm valve operator but may be employed in connection with other apparatus in other environments where mechanical force multiplication is required.

In a conventional diaphragm valve and air motor combination, a spring is required to exert its maximum force in the valve closed position. However, since the spring can only be compressed from the closed position, any movement of the spring from that point can only result in additional unnecessary force from the spring.

For example, a 3 inch weir diaphragm valve with 300 psi (pounds per square inch) line pressure requires 5,300 pounds of spring force to close the valve. Additional force exerted by compressing the spring when the valve is opened will result in 6,400 pounds of spring force, yet at full open, only 1,600 pounds of force is required.

A conventional air motor utilizes a direct communication between the diaphragm of the diaphragm valve and the spring and air motor assemblies. This direct connection delivers the same force to the valve diaphragm that is applied by the spring and/or the air motor.

For example, a direct acting air motor is a fail open operator. That is, if air pressure to the operator is ever broken, then the valve will be opened. A spring is used to maintain the open position or open the valve when air is removed from the air motor. The air motor is used to close the valve. The spring force and the force delivered from the air motor in excess of the spring force will act directly on the valve diaphragm through the valve spindle.

A second example is a reverse acting air motor. This is a fail close operator. If air pressure to the air motor is ever broken, the valve will be closed. A spring is used to maintain the closed position or to close the valve when air is removed from the air motor. The air motor is used to open the valve. The spring force and any air motor force in excess of the spring force is transmitted directly to the valve diaphragm through the valve spindle.

Other valve operators have used linkage arrangements or scissors mechanisms to actuate valves. These devices use a primary link system with either a handwheel or a small air motor reacting directly on the primary link system. These devices are either limited in stroke because angular movement is small, thus limiting the stroke; or unable to accomplish full force multiplication to benefit the air motor size. Also, these devices are not used as fail safe actuators.

SUMMARY OF THE INVENTION

An object of the present invention is to provide an improved mechanical force multiplier.

Another object of the present invention is to provide an improved mechanical force multiplier to operate a diaphragm valve.

Still another object of the present invention is to provide a lighter mechanical force multiplier for a diaphragm valve with a lower center of gravity then previously known diaphragm valve operators.

A further object of the present invention is to provide a mechanical force multiplier using a stacked link unit arrangement where a secondary or second link unit is used to operate on a primary or first link unit.

A further object of the present invention is to provide a diaphragm valve operator with the force multiplier of the present invention capable of being a reverse acting or direct acting operator providing full valve stroke.

Another object of the present invention is to provide a force multiplier in a diaphragm valve operator which is capable of closing or opening a diaphragm valve with 300 psi of line pressure at 0% pressure drop.

Still another object of the present invention is to provide a diaphragm valve operator enabling reduction of both spring size and air motor size.

A further object of the present invention is to provide a mechanical force multiplier and air motor actuator for a diaphragm valve which act as a fail safe actuator.

A feature of the present invention is the provision of a mechanical force multiplier comprising a first link unit in a force transferring relationship with one of an actuator and a device to be actuated; a second link unit pivotably connected to the first link unit and in a force transferring relationship with the other of the actuator and the device to be actuated; and at least one spring in a force transferring relationship with at least one of the first and second link units; the first and second link units being disposed between the actuator and the device to be actuated, the first and second link units in cooperation with each other and the spring to provide a relatively linearly increasing multiplied output force to the device to be actuated when the actuator is actuated.

In contrast to conventional air motor operators, the force multiplier of the present invention does not transmit forces from the spring and air motor directly to the diaphragm of the diaphragm valve. The mechanical force multiplier of the present invention actually multiplies input force from the springs and air motor before they are transmitted to the diaphragm of the diaphragm valve, thus allowing reduction in spring size and air motor size.

For example, a direct acting force multiplier and air motor assembly of the present invention is a fail open operator. Springs are used to open the valve and/or maintain the valve in an open position. The air motor is used to close the valve.

A reverse acting force multiplier and air motor assembly in accordance with the present invention is a fail close operator. Springs are used to close the valve and/or maintain the valve in a closed position. The air motor is used to open the valve. The air motor forces and spring forces are transmitted on both direct and reverse acting force multipliers in the following manner.

The spring acts through a set of linkages (known as primary links or first link units) which actually vary the output force from the spring from approximately 1 times the spring output to approximately 5.67 times the spring output force depending on the angle of the links forming the first link unit. The spring is under minimum required amount of compression at the position where the force multiplying effect is the largest and the spring is under the maximum required amount of compression at the position where the force multiplying effect is the smallest. The air motor forces are also transmitted through a set of linkages (known as secondary links or second link unit) which in turn transmit these forces through the primary or first link unit. Because the air motor force uses the force multiplying effect of both the primary and secondary links, the air motor size can substantially be reduced. The force multiplying effect of the secondary links is the smallest when the force multiplying effect of the primary links is the largest. The force multiplying effect of the secondary links is the largest when the force multiplying effect of the primary links is the smallest. This stacked mechanical force multiplier arrangement effectively reduces the air motor size required.

BRIEF DESCRIPTION OF THE DRAWING

Above-mentioned and other features and objects of this invention will become more apparent by reference to the following description taken in conjunction with the accompanying drawing, in which:

FIGS. 1 and 2 are diagrams illustrating how the applied spring force changes as the primary link angle changes when a constant output force is required;

FIG. 3 is a chart illustrating how the spring force required for a spring to close the diaphragm of the diaphragm valve varies in the mechanical force multiplier in accordance with the principles of the present invention;

FIGS. 4 and 5 are force diagrams to enable deriving equations (1)-(3) as set forth hereinbelow for a complete linkage or actuator system in accordance with the principles of the present invention;

FIG. 7 as an overall diagrammatic view of the diaphragm valve operator unit incorporating the mechanical force multiplier in accordance with the principles of the present invention taken along line 7—7 of FIG. 8;

FIG. 8 is a diagrammatic illustration of the overall diaphragm valve actuator taken along line 8—8 of FIG. 7;

FIG. 9 is a diagrammatic illustration of one mechanical force multiplier embodiment for a reverse acting diaphragm valve actuator in accordance with the principles of the present invention taken along line 9—9 of FIG. 10 with the diaphragm valve in a closed position;

FIG. 10 is a diagrammatic illustration of the embodiment of FIG. 9 taken along line 10—10 of FIG. 9;

FIG. 11 is a diagrammatic view of the mechanical force multiplier of FIG. 9 taken along line 11—11 of FIG. 12 with the diaphragm valve in a full open position;

FIG. 12 is a diagrammatic view of FIG. 11 taken along line 12—12 of FIG. 11;

FIG. 13 is a diagrammatic view of a second embodiment of the mechanical force multiplier for a direct acting diaphragm valve actuator taken along line 13—13 of FIG. 14 with the diaphragm valve in a full open position;

FIG. 14 is a diagrammatic view of the mechanical force multiplier of FIG. 13 taken along line 14—14 of FIG. 13;

FIG. 15 is a diagrammatic view of the mechanical force multiplier of FIG. 13 taken along line 15—15 of FIG. 16 with the diaphragm valve in a fully closed position;

FIG. 16 is a diagrammatic view of FIG. 15 taken along line 16—16 of FIG. 15;

FIG. 17 is a third embodiment of a mechanical force multiplier for a direct acting diaphragm valve actuator taken along line 17—17 of FIG. 18 with the diaphragm valve in a full open position;

FIG. 18 is a diagrammatic view of the mechanical force multiplier of FIG. 17 taken along line 18—18 of FIG. 17;

FIG. 19 is a diagrammatic view of the mechanical force multiplier of FIG. 17 taken along line 19—19 of FIG. 20 with the diaphragm valve in a fully closed position;

FIG. 20 is a diagrammatic view of the mechanical force multiplier of FIG. 19 taken along line 20—20 of FIG. 19;

FIG. 21 is a fourth embodiment of a mechanical force multiplier for a direct acting diaphragm valve actuator taken along line 21—21 of FIG. 22 with the diaphragm valve in a fully closed position;

FIG. 22 is a diagrammatic view of the mechanical force multiplier of FIG. 21 taken along line 22—22 of FIG. 21;

FIG. 23 is a diagrammatic view of the mechanical force multiplier of FIG. 21 taken along line 23—23 of FIG. 24 with the diaphragm valve in a full open position; and FIG. 24 is a diagrammatic view of the mechanical force multiplier of FIG. 23 taken along line 24—24 of FIG. 23.

DESCRIPTION OF THE PREFERRED EMBODIMENT

Figures 6A, 6B:
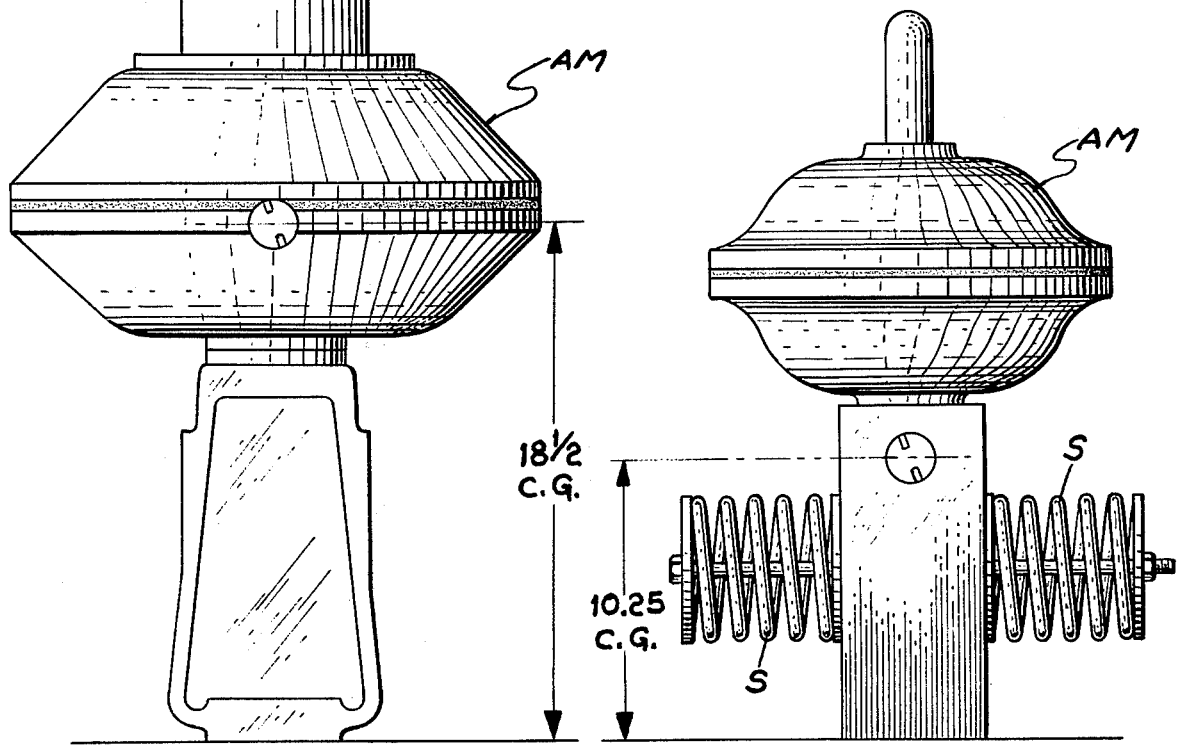
FIGS. 6A and 6B are diagrams comparing the prior art valve operator unit with the valve operator unit of the present invention.

Referring to FIGS. 1 and 2 there is illustrated therein how the applied spring force $F_S$ changes as the primary link angle changes when a constant output source $F_D$ is required. These Figures illustrate that the mechanical force multiplier of the present invention changes from 1 to 5.65, depending on the angle of primary mechanical force multiplier links. The spring force will be maximum as illustrated in FIG. 1 where the force multiplication is the smallest ($F_D = F_S$); whereas, the spring at minimum compression in FIG. 2 when the force multiplication is the largest ($F_D = 5.67\ F_S$).

Referring to FIG. 3, there is illustrated therein how the spring force required for a spring to close the diaphragm of a diaphragm valve varies in the mechanical force multiplier of the present invention. It should be noted that the maximum required force is 1,857 pounds and the minimum required force is 934 pounds. Due to this force multiplying effect, it is possible to use smaller springs in the mechanical force multiplier of the present invention, thus reducing the total spring weight and cost.

Referring to FIGS. 4 and 5, the following equations are derived which are used to calculate force for a complete diaphragm valve actuator system in accordance with the principles of the present invention.

$F_D = \frac{1}{2}$ of Total Stem Thrust $F_S =$ Force Required to Keep Primary Links in Equilibrium $F_L =$ Force Required in Secondary Link to Keep Primary Links in Equilibrium $F_A = \frac{1}{2}$ of Total Air Motor Force Required to Keep Primary Links in Equilibrium $$F_S = \frac{2 F_D}{\TAN \theta} \quad (1)$$

$$F_L = F_S \left( \frac{\SIN (180 - \theta)}{\SIN (\theta - \phi)} \right) \quad (2)$$

$$F_A = F_L \SIN \phi \quad (3)$$

Equation (2) is obtained as follows:
Definition: In a triangle with angles A, B, and C and sides opposite a, b, and c, respectively, then $$\frac{a}{\SIN A} = \frac{b}{\SIN B} = \frac{c}{\SIN C}.$$

Applying these equations to the triangle of FIG. 6.

$$\frac{F_S}{\SIN (\theta - \phi)} = \frac{F_L}{\SIN (180 - \theta)},$$
therefore, $$F_L = F_S \left( \frac{\SIN (180 - \theta)}{\SIN (\theta - \phi)} \right)$$

Referring to FIGS. 6A and 6B, there is illustrated therein a comparison of the prior art diaphragm valve operator as shown in FIG. 6A and the diaphragm valve operator of the present invention as shown in FIG. 6B. Both the prior art operator of FIG. 6A and the operator of the present invention of FIG. 6B are reverse acting air motor assemblies for a 3" weir diaphragm valve. It will be noted that the center of gravity (C.G.) is lower in the operator of the present invention as shown in FIG. 6B. The weight of the prior art operator of FIG. 6A is approximately 300 pounds as compared to approximately 150 pounds for the operator of the present invention as shown in FIG. 6B. Both of these air motor assemblies develop enough force to close a 3" weir diaphragm valve with 300 psi line pressure at 0% pressure drop. The prior art arrangement of FIG. 6A employs a Model 32130 ITT Grinnell air motor while the present invention as shown in FIG. 6B employs a Model 3350 ITT Grinnell air motor.

It will be appreciated that the prior art diaphragm valve operator as shown in FIG. 6A is relatively heavy and the center of gravity is rather far above the diaphragm valve. As can be seen from FIGS. 6A and 6B, the spring S of FIG. 6A has been moved from the top of the air motor AM to a position between the diaphragm valve and the air motor AM of FIG. 6B, moving the center of gravity closer to the diaphragm valve. In order to transmit the horizontal spring motion of springs S of the present invention as shown in FIG. 6B into a vertical spindle movement, a pair of stacked link units is used as will be discussed hereinbelow with respect to the remaining Figures.

The same reference characters will be employed for the same components throughout the following description of the various embodiments of the mechanical force multiplier of the present invention.

Referring to FIGS. 7 and 8, there is illustrated therein a diagrammatic view of an overall operator including an air motor 16 and the mechanical force multiplier disposed between air motor 16 and the controlled diaphragm valve 26. The arrangement illustrated in FIGS. 7 and 8 is a reverse acting mechanical force multiplier which is built around a yoke. The yoke serves to support air motor 16, houses link units 1 and 2 and supports the stationary link pin 19. The yoke can be made as shown in FIG. 8 by using two side yoke plates 15 bolted to a top and bottom yoke plate 18 and 17 or by casting or forging the yoke as one piece. The yoke is attached to the bonnet 20 of the diaphragm valve housing using an adaptor bushing nut 21 and is attached to the air motor 16 in a similar manner. However, any other form of attachment of the yoke to the diaphragm valve bonnet and the air motor is possible, such as bolting or casting the yoke as an integral part of the bonnet and/or the lower air motor cover. The same yoke can be made to accommodate direct acting mechanical force multipliers also. Slots 27 in the yoke plate 15 are for valve spindle position indicators.

Springs 14 and 14a are sized depending upon the diaphragm valve size and line pressure. Springs 14 and 14a are in compression. The spring retaining spindle 7 passes through the center of the inner and outer spring retaining plates 12, 12a and 13, 13a and restricts the springs by use of a nut against the spring outer plates 13 and 13a. This arrangement also provides spring force adjustment and balances the spring forces. The spring inner plates 12 and 12a rest directly against link pivot pins 22 and 22a, respectively. At pivot pins 22 and 22a the spring forces are transferred from the springs to the links.

The diaphragm spindle to link adaptor 5 is used to transmit force from the primary links to the diaphragm valve spindle.

The air motor link adaptor 4 is used to transmit the air motor force to the secondary links.

Referring to FIGS. 9 and 10, there is illustrated therein one embodiment of a mechanical force multiplier that may be employed in the diaphragm valve operator of FIGS. 8 and 9. The first or primary link unit 1 includes a first identical pair of spaced parallel link assemblies each having a link 1a having one end thereof pivotably connected to stationary point 19 adjacent adaptor 4, a link 1b having one end thereof pivotably connected to the other end of link 1a by pivot pin 22 and the other end thereof pivotably connected to adaptor 5 by pivot pin 31, a link 1d having one end thereof pivotably connected to stationary point 19a adjacent adaptor 4 and a link 1c having one end thereof pivotably connected to the other end of link 1d by pivot pin 22a and the other end thereof pivotably connected to adaptor 5 by pivot pin 33.

The secondary link unit 2 includes a second identical pair of spaced parallel link assemblies each having a link 2a having one end thereof pivotably connected to adaptor 4 by pivot pin 32 and the other end thereof pivotably connected to links 1a and 1b by pivot pin 22 and a link 2b having one end thereof pivotably connected to adaptor 4 by pivot pin 30 and the other end thereof pivotably connected to links 1c and 1d by pivot pin 22a. The arrangement of the mechanical force multiplier just described is for a reverse acting mechanical force multiplier with the orientation of the various links illustrated in FIGS. 10 and 11 being that orientation when the diaphragm valve is in a fully closed position.

Referring to FIGS. 11 and 12, the mechanical force multiplier is that of FIGS. 9 and 10, but with the diaphragm valve in a full open position.

The operation of the reverse acting mechanical force multiplier of FIGS. 9–12 will now be described. In the closed position the reverse acting mechanical force multiplier appears as illustrated in FIGS. 9 and 10.

Springs 14 and 14a of FIG. 7 act on the primary link unit 1 with minimum spring force. However, the links are in a position where the force multiplying effect is a maximum; thus, high force is delivered to the diaphragm spindle 6 of the diaphragm valve thereby closing this valve. To open the diaphragm valve the top chamber of the air motor 16 of FIG. 7 is pressurized. As the air motor spindle 3 moves down, the secondary link unit 2 push the pivot pins 22 and 22a outboard, compressing springs 14 and 14a of FIG. 7. The upper primary links 1a and 1d rotate on the stationary link pins 19 and 19a, respectively, thus the angle of the links of the primary link unit starts to decrease resulting in smaller force multiplying effects. However, springs 14 and 14a are being compressed so the resultant output force to the diaphragm of the diaphragm valve remains fairly constant. During this time the links of the secondary unit 2 are moving from a low force multiplying effect to a higher force multiplying effect. As the pivot pins 22 and 22a move outboard, the adaptor 5 is allowed to move up, opening the valve. Finally at a full open position, the links of the mechanical force multiplier are as shown in FIGS. 11 and 12. The stationary points 19 and 19a have not moved. The air motor spindle 3 has moved down. The diaphragm spindle 6 has moved up. The springs 14 and 14a are in maximum compression.

To close the diaphragm valve, air pressure is released from the air motor. The spring force moves the links of the mechanical force multiplier back to the position shown in FIGS. 10 and 11.

Referring to FIGS. 13, 14, 15 and 16, there is illustrated diagrammatically the link configuration for a direct acting mechanical force multiplier. FIGS. 13 and 14 illustrate this embodiment of the mechanical force multiplier in the diaphragm valve full open position, while FIGS. 15 and 16 show the mechanical force multiplier in the diaphragm valve closed position.

The direct acting mechanical force multiplier is built around a yoke as is the reverse acting mechanical force multiplier as illustrated in FIGS. 7 and 8. All aspects of the yoke pertaining to the reverse acting mechanical force multiplier of FIGS. 7-12 also apply to the direct acting mechanical force multiplier of FIGS. 13-16.

The springs 14 and 14a of FIG. 7 are sized depending on diaphragm valve size. The springs are in compression. The spring retaining spindles 7 as shown in FIG. 7 pass through the center of the inner and outer spring retaining plates 12, 12a and 13, 13a, and are attached to the spring retaining spindle connector 9 as illustrated in FIGS. 13-15. Connector 9 is required to bridge the diaphragm valve spindle 6 which must pass through it. The spring retaining spindles 7 restrict the springs 14 and 14a by use of a nut against the spring outer plates 13 and 13a, provided spring force adjustment, and balances the spring forces from both springs. The spring inner plates rest directly against pivot pins 22 and 22a. It is there pivot pins at which the spring forces are transferred directly to the links.

The valve diaphragm spindle to links adaptor 5 is used to transmit force from the primary links 1 to the diaphragm spindle 6.

Forces from the air motor to the air motor link adaptor 4 are transferred by means of an intermediate adaptor 11 and an air motor link adaptor to intermediate adaptor rods 8. The forces are then transferred to the secondary link unit 2.

The first link unit includes link adaptor 5 having a force transferring relationship with diaphragm spindle 6 and a first identical pair of spaced parallel link assemblies. These link assemblies include a link 1a having one end thereof pivotably connected to one end of link adaptor 5 by pivot pin 34, a link 1b having one end thereof pivotably connected to the other end of link 1a by pivot pin 22 and the other end thereof pivotably connected to a stationary point 19' adjacent spindle 6, a link 1d having one end thereof pivotably connected to the other end of link adpator 5 by pivot pin 35 and a link 1c having one end thereof pivotably connected to the other end of link 1d by pivot pin 22a and the other end thereof pivotably connected to a stationary point 19a' adjacent spindle 6. The second link unit 2 includes a second identical pair of spaced parallel link assemblies each having a link 2a having one end thereof pivotably connected to adaptor 4 by pivot pin 31 and the other end thereof pivotably connected to links 1c and 1d by pivot pin 22a and a link 2b having one end thereof pivotably connected to adaptor 4 by pivot pin 33 and the other end thereof pivotably connected to links 1a and 1b by pivot pin 22.

The operation of the embodiment of the mechanical force multiplier of FIGS. 13-16 are as follows. In the open position, the direct acting mechanical force multiplier appearance is similar to the arrangement shown in FIG. 7. The springs 14 and 14a act on the primary or first link unit 1 to keep the diaphragm valve open. The primary link unit 1 at this point is in position where the force multiplying effect is at a maximum. To close the diaphragm valve, the bottom chamber of the air motor 16 is pressurized. As the air motor spindle 3 moves up, the secondary or second link unit 2 push pivot pins 22 and 22a outboard, compressing the springs 14 and 14a as illustrated in FIGS. 13-16. The lower links 1b and 1c of the primary link unit 1 rotate outboard about the stationary pivot pins 19' and 19', respectively, thus the angle of the links of primary link unit 1 starts to decrease. As the links of primary unit 1 rotate outboard they pull down link adaptor 5, closing the diaphragm valve, moving from a high force multiplying effect to a smaller force multiplying effect. During this time, the links of the second link unit 2 are moving from a low force multiplying effect to a higher force multiplying effect as adaptor 4 moves up. Finally, at a full closed position, the linkage of the two link units look as illustrated in FIGS. 15 and 16. The stationary points 19' and 19a' have not moved. The air motor spindle 3 has moved up. The diaphragm valve spindle 6 has moved down to close the diaphragm valve. The springs 14 and 14a of FIG. 7 are compressed to reopen the diaphragm valve.

To open the diaphragm valve, air pressure is released from the air motor 16. The forces of springs 14 and 14a move the links of the two links back to the position as illustrated in FIGS. 13 and 14.

As illustrated in FIGS. 7-16, two springs 14 and 14a are used, one on each side of the mechanical force multiplier. It is possible to use only one spring. For instance, the spring retaining rod 7 would extend through spring plate 13, spring 14, inner spring plate 12 and inner spring plate 12a. It should also be noted that spring plate 13a, spring 14a, retaining rod 7, inner spring plate 12a and inner spring plate 12 could be used by itself in place of the single spring arrangement just described.

In addition to the direct acting mechanical force multiplier as shown by the link configuration in FIGS. 13-16, there are two other link configurations that can be used for direct acting mechanical force multipliers for controlling diaphragm valves.

The first configuration is illustrated in FIGS. 17-20. As shown in FIGS. 17-20, the link configuration of the link units of the mechanical force multiplier are the same as illustrated in FIGS. 13-16. The difference between these two mechanical force multipliers is that the two springs mounted on the side, used to return the diaphragm valve to the open position, have been replaced by one spring 36 disposed between the top cover 37 and diaphragm 38 of air motor 16. Spring 36 is placed between the upper air motor cover 37 and the air motor diaphragm 38 so that spring 36 will always exert a force down on air motor spindle 3 forcing the diaphragm valve into the full open position. When air is supplied through port 39 in the lower chamber of air motor 16, the air motor force counteracts the spring force in addition to the force in the linkage of the two link units due to pressure in the diaphragm valve and closes the diaphragm valve.

The second alternative configuration is illustrated in FIGS. 21-24. This direct acting mechanical force multiplier is similar to that illustrated in FIGS. 17-20 in that the spring 36 is located between the upper air motor cover 37 and the air motor diaphragm 38 as illustrated in FIG. 17. However, as illustrated in FIGS. 21-24, the reverse acting link configuration of the two link units 1 and 2 as illustrated in FIGS. 9-12 is used as the linkage arrangement for the two link units 1 and 2 for this direct acting mechanical force multiplier. Spring 36 in air motor 16 exerts a force down on air motor spindle 3 which forces the diaphragm valve into the open position. When air is supplied to air inlet 39 in the bottom chamber of air motor 16, the air motor force counteracts the spring force in addition to the force in the linkage of link units 1 and 2 due to pressure in the diaphragm valve and closes the diaphragm valve.

The advantage of using these two types of alternate forms of the mechanical force multiplier is basically that the number of parts required is reduced and the mechanical force multiplier will be easier to assemble and less expensive.

The above alternative forms are practical on a direct acting mechanical force multiplier because of the relatively small force required to open the diaphragm valve against vacuum.

Throughout the description of the FIGS. 7-24 the operator for the mechanical force multiplier has been referred to as an air motor. At this point, it should be noted that the mechanical force multiplier can be used with any type of operator that provides a linear motion or any motion that can be converted to a linear motion. Examples of such alternate operators are: (1) handwheel operator; (2) electric operator; (3) piston operator; and (4) in general, any type of operator that could be conceivably used with the mechanical force multiplier.

Any operator used will be mounted on top of the mechanical force multiplier unit as is the air motor as shown in FIGS. 7 and 8.

As examples, primary link unit angles of 45° and 80° with respective force multipliers of 1 and 5.67 have been used throughout this description. It should be pointed out that these are only examples and any angle and associated force multiplier can be used for the primary link unit and secondary link unit.

While I have described above the principles of my invention in connection with specific apparatus it is to be clearly understood that this description is made only by way of example and not as a limitation to the scope of my invention as set forth in the objects thereof and in the accompanying claims.

I claim:

1. A mechanical force multiplier comprising:
   a first link unit having at least a first pair of links, each of said first pair of links having one end thereof pivotably coupled to and in a force transferring relationship with one of an actuator having an actuator force and a device to be actuated and a second pair of links each of said second pair of links having one end thereof pivotably connected to a stationary point distinct and spaced from both said actuator and said device to be actuated and the other end thereof pivotably connected to the other end of an associated one of said first pair of links;
   a second link unit having at least a third pair of links, each of said third pair of links having one end thereof pivotably connected to said other end of an associated one of said first and second pair of links and the other end thereof pivotably coupled to and in a force transferring relationship with the other of said actuator and said device to be actuated;
   said first, second and third pair of links defining a volume having a longitudinal dimension, each of said first and third pair of links having an angle therebetween on the inside of said volume that is less than 180° at all times; and
   at least one spring in a force transferring relationship with at least one of said first and second link units, said spring being disposed outside of said volume with the force thereof being directed perpendicular to said longitudinal dimension from the outside of said volume toward the inside thereof;
   said first and second link units being disposed between said actuator and said device to be actuated, said first and second link units in cooperation with each other and said spring providing a relatively linearly increasing multiplied output force to said device to be actuated for activation thereof when said actuator is actuated.

2. A multiplier according to claim 1, wherein said actuator and said device to be actuated are disposed coaxial of a common vertical axis and said spring is disposed coaxial of a horizontal axis at right angles to said common vertical axis and said spring force is transferred at right angles to said common vertical axis.

3. A multiplier according to claim 2, wherein two springs are diametrically disposed on opposite sides of said first and second link units and coaxial of said horizontal axis, said force of said two springs being directed toward each other in a force transferring relationship with at least one of said first and second link units.

4. A multiplier according to claim 1, wherein said actuator and said device to be actuated are disposed coaxial of a common vertical axis and said spring is disposed coaxial of said common vertical axis, said force of said spring being transferred parallel to said common vertical axis.

5. A multiplier according to claim 1, wherein said first link unit includes
   a first identical pair of spaced parallel link assemblies each having
      a first link having one end thereof pivotably connected to a first stationary point adjacent said actuator, a second link having one end thereof pivotably connected to the other end of said first link at a first point and the other end thereof pivotably connected to said device to be actuated, a third link having one end thereof pivotably connected to a second stationary point adjacent said actuator, and a fourth link having one end thereof pivotably connected to the other end of said third link at a second point and the other end thereof pivotably connected to said device to be actuated; and said second link unit includes a second identical pair of spaced parallel link assemblies each having a fifth link having one end thereof pivotably connected to said actuator and the other end thereof pivotably connected to said first and second links at said first point, and a sixth link having one end thereof pivotably connected to said actuator and the other end thereof pivotably connected to said third and fourth links at said second point.

6. A multiplier according to claim 5, wherein a pair of springs each transferring their respective force horizontally to a different one of said first and second points.

7. A multiplier according to claim 5, wherein said spring transfers its force to said fifth and sixth links.

8. A multiplier according to claim 5, wherein said actuator force is directed toward said device to be actuated.

9. A multiplier according to claim 5, wherein said actuator force is directed away from said device to be actuated.

10. A multiplier according to claim 1, wherein said first link unit includes a first identical pair of spaced parallel link assemblies each having a first link having one end thereof pivotably connected to said device to be actuated, a second link having one end thereof pivotably connected to the other end of said first link at a first point and the other end thereof pivotably connected to a first stationary point adjacent said device to be actuated, a third link having one end thereof pivotably connected to said device to be actuated, and a fourth link having one end thereof pivotably connected to the other end of said third link at a second point and the other end thereof pivotably connected to a second stationary point adjacent said device to be actuated; and said second link unit includes a second identical pair of spaced parallel link assemblies each having a fifth link having one end thereof pivotably connected to said actuator and the other end thereof pivotably connected to said first and second links at said first point, and a sixth link having one end thereof pivotably connected to said actuator and the other end thereof pivotably connected to said third and fourth links at said second point.

11. A multiplier according to claim 10, wherein a pair of springs each transferring their respective force horizontally to a different one of said first and second points.

12. A multiplier according to claim 10, wherein said spring transfers its force to said fifth and sixth links.

13. A multiplier according to claim 10, wherein said actuator force is directed away from said device to be actuated.

14. A multiplier according to claim 1, wherein said actuator includes
an air motor; and
said device to be actuated includes
a diaphragm valve.

15. A multiplier according to claim 14, wherein said motor and said valve are disposed coaxial of a common vertical axis and said spring is disposed coaxial of a horizontal axis at right angles to said common vertical axis and said spring force is transferred at right angles to said common vertical axis.

16. A multiplier according to claim 15, wherein two springs are diametrically disposed on opposite sides of said first and second link units and coaxial of said horizontal axis, said force of said two springs being directed toward each other in a force transferring relationship with at least one of said first and second link units.

17. A multiplier according to claim 14, wherein said motor and said valve are disposed coaxial of a common vertical axis and said spring is disposed in said motor coaxial of said common vertical axis, said force of said spring being transferred parallel to said common vertical axis.

18. A multiplier according to claim 14, wherein said first link unit includes a first identical pair of spaced parallel link assemblies each having a first link having one end thereof pivotably connected to a first stationary point adjacent said motor, a second link having one end thereof pivotably connected to the other end of said first link at a first point and the other end thereof pivotably connected to said valve, a third link having one end thereof pivotably connected to a second stationary point adjacent said motor, and a fourth link having one end thereof pivotably connected to the other end of said third link at a second point and the other end thereof pivotably connected to said valve; and said second link unit includes a second identical pair of spaced parallel link assemblies each having a fifth link having one end thereof pivotably connected to said motor and the other end thereof pivotably connected to said first and second links at said first point, and a sixth link having one end thereof pivotably connected to said motor and to the other end thereof pivotably connected to said third and fourth links at said second point.

19. A multiplier according to claim 18, wherein a pair of springs each transferring their respective force horizontally to a different one of said first and second points.

20. A multiplier according to claim 18, wherein said spring transfers its force to said fifth and sixth links.

21. A multiplier according to claim 18, wherein said actuator force is directed toward said device to be actuated.

22. A multiplier according to claim 18, wherein said actuator force is directed away from said device to be actuated.

23. A multiplier according to claim 14, wherein said first link unit includes
   a first identical pair of spaced parallel link assemblies each having
      a first link having one end thereof pivotably connected to said valve,
      a second link having one end thereof pivotably connected to the other end of said first link at a first point and the other end thereof pivotably connected to a first stationary point adjacent said valve,
      a third link having one end thereof pivotably connected to said valve, and
      a fourth link having one end thereof pivotably connected to the other end of said third link at a second point and the other end thereof pivotably connected to a second stationary point adjacent said valve; and
said second link unit includes
   a second identical pair of spaced parallel link assemblies each having
      a fifth link having one end thereof pivotably connected to said motor and the other end thereof pivotably connected to said first and second links at said first point, and
      a sixth link having one end thereof pivotably connected to said motor and the other end thereof pivotably connected to said third and fourth links at said second point.

24. A multiplier according to claim 23, wherein a pair of springs each transferring their respective force horizontally to a different one of said first and second points.

25. A multiplier according to claim 23, wherein said spring transfers its force to said fifth and sixth links.

26. A multiplier according to claim 23, wherein said actuator force is directed away from said device to be actuated.

* * * * *